(12) United States Patent
Thompson (10) Patent No.: US 11,980,122 B2
(45) Date of Patent: May 14, 2024

(54) SYSTEM AND METHOD FOR CONTROLLING PRODUCT CONVEYANCE IN RESPONSE TO NEAR-PLUG DETECTION

(71) Applicant: CNH Industrial Canada, Ltd., Saskatoon (CA)

(72) Inventor: Dennis George Thompson, Eagle Ridge (CA)

(73) Assignee: CNH Industrial Canada, Ltd. (CA)

( * ) Notice: Subject to any disclaimer, the term of this patent is extended or adjusted under 35 U.S.C. 154(b) by 353 days.

(21) Appl. No.: 17/488,757

(22) Filed: Sep. 29, 2021

(65) Prior Publication Data
US 2023/0094915 A1 Mar. 30, 2023

(51) Int. Cl.
*A01C 7/10* (2006.01)
*A01C 7/08* (2006.01)

(52) U.S. Cl.
CPC .............. *A01C 7/105* (2013.01); *A01C 7/082* (2013.01)

(58) Field of Classification Search
None
See application file for complete search history.

(56) References Cited

U.S. PATENT DOCUMENTS

| | | | |
|---|---|---|---|
| 5,831,542 A * | 11/1998 | Thomas | A01C 7/105 340/684 |
| 5,923,262 A * | 7/1999 | Fuss | A01C 7/081 340/684 |
| 6,192,813 B1 | 2/2001 | Memory et al. | |
| 6,296,425 B1 | 10/2001 | Memory et al. | |
| 8,893,630 B2 | 11/2014 | Kowalchuk | |
| 8,928,486 B2 * | 1/2015 | Hui | A01C 7/102 56/10.2 J |
| 9,565,798 B2 | 2/2017 | Baker | |
| 9,999,174 B2 | 6/2018 | Funck | |
| 10,123,524 B2 * | 11/2018 | Roberge | A01C 7/081 |
| 10,398,076 B1 * | 9/2019 | Rempel | A01C 7/102 |
| 10,549,932 B2 | 2/2020 | Henry | |
| 10,757,856 B2 | 9/2020 | Körösi et al. | |

(Continued)

FOREIGN PATENT DOCUMENTS

| CN | 110196087 | 9/2019 |
|---|---|---|
| WO | 2020049387 | 3/2020 |

*Primary Examiner* — Joseph A Dillon, Jr.
(74) *Attorney, Agent, or Firm* — Rebecca L. Henkel; Peter K. Zacharias; Rickard K. DeMille (57) ABSTRACT

A near-plug monitoring system includes particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the secondary distribution lines. The system includes a controller configured to receive feedback from the particle flow rate sensors, to determine a real-time flow rate of the granular product in the secondary distribution lines, to determine if a near-plug condition is occurring in at least one secondary distribution line based on the real-time flow rate, and to automatically provide a control signal to alter one or more operating parameters of the pneumatic conveyance system when the near-plug condition is occurring to resolve the near-plug condition.

11 Claims, 3 Drawing Sheets

(56) References Cited

U.S. PATENT DOCUMENTS

| | | | |
|---|---|---|---|
| 10,791,727 B2* | 10/2020 | Roberge | A01M 7/0003 |
| 11,583,880 B2* | 2/2023 | Hüdepohl | A01C 21/00 |
| 2015/0366127 A1* | 12/2015 | Roberge | A01C 15/04 |
| | | | 239/11 |
| 2016/0157418 A1* | 6/2016 | Henry | A01C 7/084 |
| | | | 701/50 |
| 2019/0045772 A1* | 2/2019 | Roberge | A01C 15/04 |
| 2019/0289776 A1 | 9/2019 | Rempel et al. | |
| 2020/0245529 A1 | 8/2020 | Thompson et al. | |
| 2020/0337223 A1 | 10/2020 | Snipes et al. | |
| 2020/0344943 A1 | 11/2020 | Garner et al. | |
| 2023/0189695 A1* | 6/2023 | Gotzen | A01C 7/123 |
| | | | 111/174 |

* cited by examiner

SYSTEM AND METHOD FOR CONTROLLING PRODUCT CONVEYANCE IN RESPONSE TO NEAR-PLUG DETECTION

BACKGROUND

The disclosure relates generally to an agricultural product distribution system and, more specifically, utilizing a near-plug monitoring system for an agricultural product distribution system.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. In certain embodiments, the air cart may be connected in series with the seeding implement (e.g., in front of or behind the seeding tool to form a multi-implement train). The air cart may generally include a storage tank (e.g., a pressurized tank) having separate compartments for different product types (e.g., seed, fertilizer, etc.), an air source (e.g., a blower), and a metering assembly. More specifically, the granular products (seeds, fertilizer, etc.) may be gravity fed from the storage tank into the metering assembly, which distributes a desired flow rate of the granular products to each of the row units. For example, the air source may generate an air stream and the metering assembly may control flow of granular products into the air stream such that the granular products are entrained in the air stream. The air stream may then be supplied to each of the row units via primary lines and secondary lines fluidly coupled between the metering assembly and the row units, thereby delivering the granular products to each of the row units for deposition. These primary and secondary lines are subject to plugging which may adversely affect the distribution of the product and/or result in stopping the distribution operation in order to resolve the plugging issue.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a near-plug monitoring system for a pneumatic conveyance system of an agricultural implement is provided. The system includes one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines. The system also includes a controller coupled to the one or more particle flow rate sensors and configured to receive feedback from the one or more particle flow rate sensors, to determine a real-time flow rate of the granular product in the plurality of secondary distribution lines, to determine if a near-plug condition is occurring in at least one secondary distribution line of the plurality of secondary distribution lines based on the real-time flow rate in the at least one secondary distribution line, and to automatically provide a control signal to alter one or more operating parameters of the pneumatic conveyance system when the near-plug condition is occurring to resolve the near-plug condition.

In another embodiment, a method for near-plug monitoring of a pneumatic conveyance system of an agricultural implement is provided. The method includes receiving, at a controller, feedback from one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines. The method also includes determining, via the controller, a real-time flow rate of the granular product in the plurality of secondary distribution lines based on the feedback. The method further includes determining, via the controller, if a near-plug condition is occurring in at least one secondary distribution line of the plurality of secondary distribution lines based on the real-time flow rate in the at least one secondary distribution line. The method even further includes automatically providing, via the controller, a control signal to alter one or more operating parameters of the pneumatic conveyance system when the near-plug condition is occurring to resolve the near-plug condition.

In a further embodiment, a non-transitory computer-readable medium is provided. The computer-readable medium includes processor-executable code that when executed by a processor, causes the processor to receive feedback from one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines. The computer-readable medium also includes processor-executable code that when executed by the processor, causes the processor to determine a real-time flow rate of the granular product in the plurality of secondary distribution lines based on the feedback. The computer-readable medium further includes processor-executable code that when executed by the processor, causes the processor to determine if a near-plug condition is occurring in at least one secondary distribution line of the plurality of secondary distribution lines based on the real-time flow rate in the at least one secondary distribution line. The computer-readable medium even further includes processor-executable code that when executed by the processor, causes the processor to automatically provide a control signal to alter one or more operating parameters of the pneumatic conveyance system when the near-plug condition is occurring to resolve the near-plug condition.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally, an agricultural product distribution system may include a towable agricultural implement to deposit a granular product into the soil. As used herein, the granular product may be any suitable particulate material that is desired to be deposited into the ground, such as various types of seeds and fertilizers. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a product distribution system on the air cart may pneumatically convey the granular product to the row units. For example, the metering assembly may control output of the granular product from a storage tank into an air stream, which is then delivered to the row units by a blower via pneumatic lines (e.g., including a primary line coupled to the air cart) that fluidly connects the metering assembly to the row units (e.g., via a distribution header coupled to secondary lines). During distribution operations these lines may become plugged, thus, hindering the distribution of the granular product.

Accordingly, as will be described in more detail below, embodiments described herein provide a near-plug monitoring system that monitors for impending plugs in a pneumatic distribution system (e.g., in the secondary distribution lines) of an agricultural implement (e.g., seeding implement). In particular, the near-plug monitoring system utilizes particle flow rate/count sensors to determine if a plug is impending or about to occur in one or more secondary distribution lines and when a near-plug condition is occurring actively takes action (via controller) in real-time to resolve the near-plug condition or prevent the plug from occurring. These actions may include adjusting an automatic fan control system parameter (e.g., a rotational speed of a fan fluidly coupled to the primary distribution line, air velocity in the primary distribution line, or mass air flow rate in the primary distribution line). In certain embodiments, these actions may include reducing machine ground speed temporarily instead of or in addition to adjusting an automatic fan control system parameter. The near-plug monitoring system provides the ability to automatically resolve potential plugging of the pneumatic conveyance system and, thus, avoid adversely affecting or stopping the distribution of the granular product.

Figure 1:
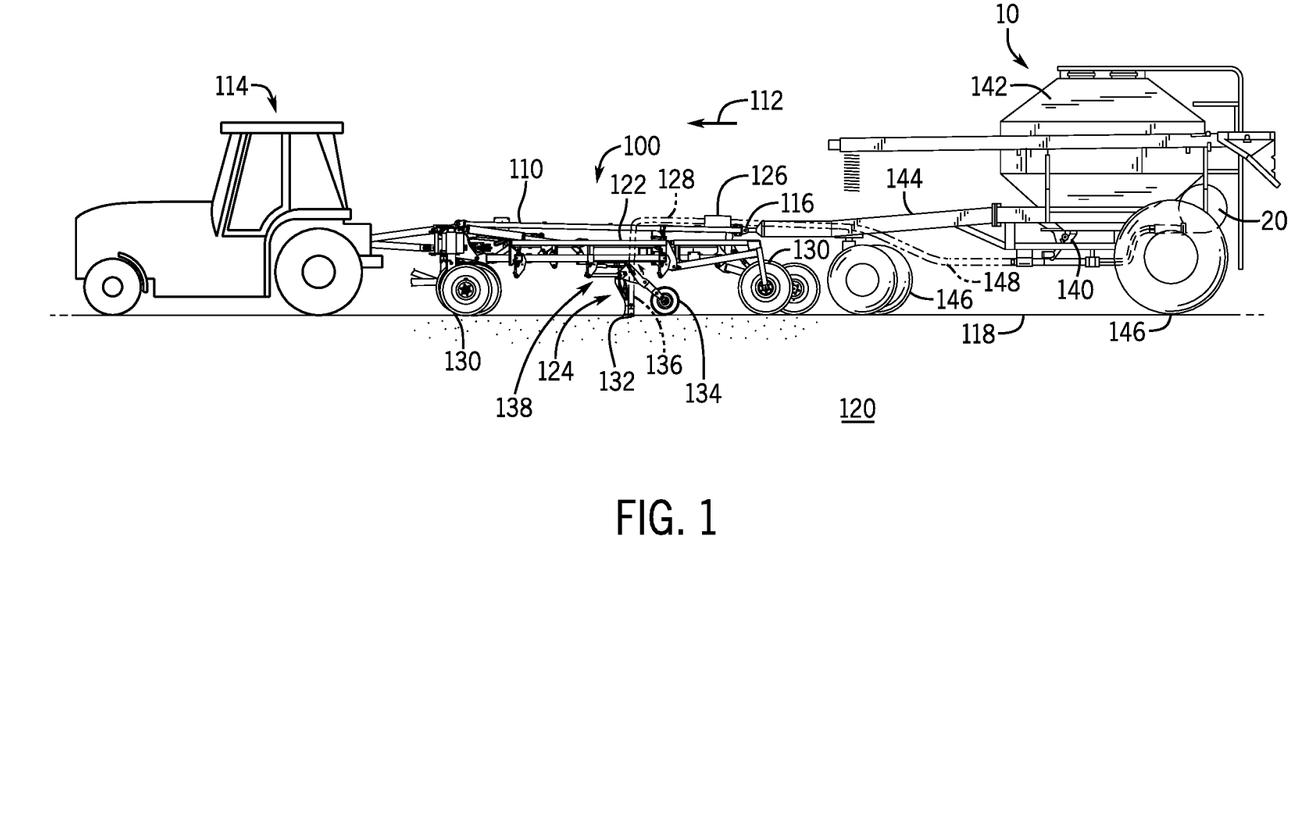
FIG. 1 is a side view of an agricultural material application system utilizing a near-plug monitoring system, in accordance with an embodiment.

Turning now to the drawings, FIG. 1 is a side view of an embodiment of an agricultural material application system 100. As depicted, the agricultural material application system 100 (e.g., a seeding system or a planter system) includes an agricultural implement 110 (e.g., seeding implement or seeding toolbar) coupled to an air cart 10. In the depicted embodiment, the air cart 10 is towed behind the agricultural implement 110, relative to a direction of travel 112. In addition, the agricultural implement 110 is coupled to a work vehicle 114 by a first hitch system, and the air cart 10 is coupled to the agricultural implement 110 by a second hitch system 116. While the agricultural implement 110 is towed between the work vehicle 114 and the air cart 10 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 110 may deposit rows of seeds into the soil as the agricultural implement 110 is towed across a surface 118 of an agricultural field 120 by the work vehicle 114. The agricultural implement 110 includes a tool frame 122 coupled to a row unit 124 (e.g., a ground engaging opener system), a distribution header 126, a hose or line 128 (e.g., primary distribution line), and wheel assemblies 130. The wheel assemblies 130 may contact the surface 118 to enable the agricultural implement 110 to be towed by the work vehicle 114. As the agricultural implement 110 moves in the direction of travel 112, a row of seeds may be deposited into the soil by the row unit 124. Although only one row unit 124 is shown, the agricultural implement 110 may include multiple row units 124 organized in a single row or multiple rows across the width of the agricultural implement 110. In some embodiments, the agricultural implement 110 may include a row of 12, 14, 16, 18, 20, or more row units 124, which may each deposit a respective row of seeds.

To facilitate depositing seeds, each row unit 124 includes an opener 132, a press wheel 134, a seed tube 136, and a hydraulic cylinder 138. In certain embodiments, a cutting disc may be utilized in place of the opener 132. In certain embodiments, a press wheel 134 may not be utilized. In certain embodiments, mechanical springs may be utilized for downforce instead of the hydraulic cylinder 138. When the opener 132 engages the soil, the opener 132 may exert a force that excavates a trench into the soil as the row unit 124 travels through the field. In the present embodiment, a position of the press wheel 134 controls the depth of the opener 132 and the hydraulic cylinder 138 controls the downward force (e.g., a down pressure). For example, the opener 132 may be controlled to establish a target the depth of the trench. In certain embodiments, disc coulter openers may utilize a gauge wheel situated adjacent to a cutting disc to control the working depth of the opener 132. Seeds may then be deposited into the excavated trench via the seed tube 136. Then, the press wheel 134 may facilitate movement of the excavated soil into the trench to cover the seeds and compress the soil covering the seeds.

The air cart 10 may centrally store seeds and distribute the seeds to the row unit 124. Accordingly, the air cart 10 includes a metering assembly 140 (e.g., agricultural material meter), a storage tank 142, a frame 144, wheels 146, and an air source 20. In the depicted embodiment, the air cart frame 10 is coupled to the tool frame 122 via the hitch 116. The wheels 146 may contact the surface 118 to enable the air cart 10 to be towed along with the agricultural implement 110. Additionally, the storage tank 142 may centrally store the seeds for distribution. In some embodiments, the storage tank 142 may include multiple compartments or multiple tanks on a common frame for storing different types of granular materials. For example, a first compartment may store seeds while a second compartment may store a dry fertilizer. In such configurations, the air cart 10 may deliver both seed and fertilizer to the agricultural implement 110 via separate distribution systems, or as a mixture through a single distribution system.

Generally, the distribution system may control the amount of seeds distributed to the agricultural field 120, for example, using the metering assembly 140. For example, the metering assembly 140 may be controlled to increase or decrease the amount of seeds distributed to the agricultural field 120. As depicted, the metering assembly 140 is mounted to the bottom of the storage tank 142, which may enable the storage tank 140 to supply seeds to the metering assembly 140. The metering assembly 140 may then distribute the seeds to the distribution header 126 via a respective hose or line 148 (e.g., primary distribution line). In certain embodiments, the distribution system may include more than one primary hose 148. The distribution headers 126 may then distribute the seeds to one or more row units 124 via one or more hoses 128 (e.g., secondary distribution lines). In this manner, the metering assembly 134 may control distribution of seeds from the storage tank 142 to the row units 124 and into the trenches.

Figure 2:
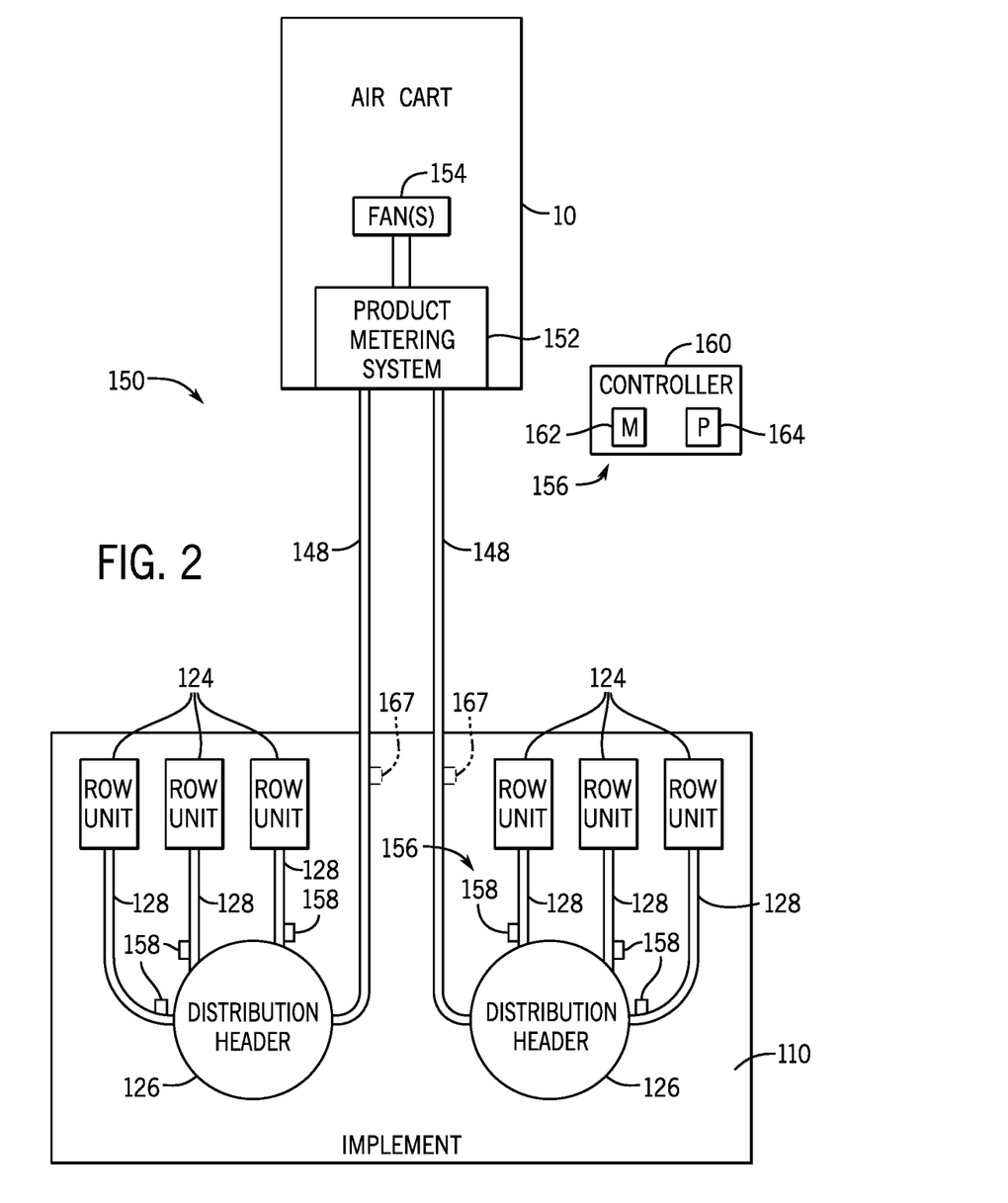
FIG. 2 is a schematic diagram of an air cart coupled to an implement, as shown in FIG. 1, having a near-plug monitoring system for a distribution system, in accordance with an embodiment.

FIG. 2 is a schematic diagram of the air cart 10 coupled to the implement 110, as shown in FIG. 1, illustrating a distribution system 150 (e.g., pneumatic conveyance system) including a product metering system 152 (e.g., metering assembly 140 in FIG. 1) and a near-plug monitoring system 156. In the illustrated embodiment, the distribution system 150 includes the product metering system 152, the primary distribution hoses 148, distribution headers 126, and secondary distribution hoses 128. The granular agricultural product is delivered from the air cart 10 to the row units 124 using the distribution system 150. For example, the distribution system 150 transfers the agricultural product using the product metering system 152 to primary distribution hoses 148. Subsequently, the primary distribution hoses 148 transfer the agricultural product to the distribution headers 126 positioned on the implement 110. Finally, the distribution headers 26 transfer the product through the secondary distribution hoses 128 to deliver the product to the row units 124 of the implement 110.

The distribution system 150 includes one or more fans 154 for generating an air flow directed through a corresponding primary distribution hose 148. The granular product supplied to the primary distribution hose 148 from a storage compartment of the air cart 152 becomes entrained in the air flow through the primary distribution line 148 and is carried by the air flow downstream. In certain embodiments, each primary distribution hose 148 may be associated with a respective fan 154.

The air cart 10 may contain one product or multiple products that are transferred using the distribution system 150. For example, certain distribution systems 150 are configured to mix multiple products, and transfer the products together to the row units 124. Such systems may be known as "single shoot" distribution systems 150. Alternatively, certain distribution systems 150 are configured to transfer product separately to the row units 124. Such systems may be known as "double shoot" systems 150. The air cart 10, as shown in FIG. 2, includes a single shoot distribution system 150. However, other embodiments within the scope of this disclosure may include double shoot distribution systems 150.

The product metering system 152 controls the rate at which product is transferred to the primary distribution hoses 148. For example, the product metering system 50 may contain one or more meter rollers that transfer the product from the air cart 10 to the primary distribution hoses 148. In configurations that employ multiple meter rollers, the meter rollers may be configured to operate collectively or individually. For example, if the implement 110 passes over a swath of soil that is partially planted, the distribution system 150 may activate certain meter rollers to deliver product to row units 124 in the unplanted sections while deactivating other meter rollers to block product delivery to row units 124 in the planted sections. In this manner, the implement 110 may provide a substantially even distribution of product to the soil, thereby substantially reducing wasted product associated with double-planting certain areas of the soil. In addition, the meter rollers may also contain a holding chamber to provide a steady flow of product to the primary distribution hoses 126.

The primary distribution hoses 148 are coupled to the product metering system 152 and configured to receive product from the product metering system 152. Although two primary distribution hoses 148 are depicted, any suitable number of hoses may be used. For example, some embodiments may only use one primary distribution hose 148, while other embodiments use 3, 4, 5, 6, 7, 8, 9, 10 or more primary distribution hoses 148. The number and length of primary distribution hoses 148 may be at least partially dependent on the output of an air source, the type of product being used, and/or the configuration of the implement 110 connected to the primary distribution hoses 148.

The distribution headers 126 receive the product from the primary distribution hoses 148. Generally, the number of distribution headers 126 matches the number of primary distribution hoses 148. However, some embodiments may incorporate multiple primary distribution hoses 148 into a single distribution header 126, or one primary distribution hose 148 may be coupled to multiple distribution headers 126. In addition, there may be any suitable number of distribution headers 126. For example, some embodiments may use only one distribution header 126, while other embodiments use 3, 4, 5, 6, 7, 8, 9, 10 or more distribution headers 126. The distribution headers 126 distribute the product along the secondary distribution hoses 128. While three secondary distribution hoses 128 are depicted for each of the distribution headers 126, any suitable number of the secondary distribution hoses 128 may be used.

The secondary distribution hoses 128 provide a flow path for the product to be transferred from the distribution header 126 to the row units 124. Generally there is a secondary distribution hose 128 for each row unit 124. However, there may be multiple secondary distribution hoses 128 going to a single row unit 124, or one secondary distribution hose 128 may provide product to multiple row units 124. For example, a double shoot system, where multiple products are transferred separately, may have multiple secondary distribution hoses 128 going to a single row unit 124.

In certain embodiments, the distribution system 150 enables individual or combined control of product distribution from the air cart 10 to the primary distribution hoses 148. For example, the distribution system 150 may individually stop, start, and/or regulate product delivery rates for each primary distribution hose 148. In addition, the distribution system 150 may block the flow of product when portions of the product metering system 152 are stopped.

As depicted, a near-plug monitoring system 156 may be coupled to the distribution system 150 to monitor for impending plugs in the distribution system (e.g., in the secondary distribution hoses 128) of the agricultural implement 110. The near-plug monitoring system 156 includes a plurality of sensors 158 (e.g., particle flow rate sensors or particle counting sensors) disposed along the distribution system 150. In certain embodiments, the sensor 158 may include a sensor array disposed in a single sensor housing. The sensors 158 are configured to count the granular product (e.g., when flowing through a sensing area) and determine a real-time flow rate of the granular product. The sensors 158 may utilize one or more of photoelectric sensing, machine vision sensing, piezoelectric sensing, acoustic sensing, and/or another sensing technology. As depicted, a respective sensor 158 is disposed along each secondary distribution line 128 at a location adjacent the distribution header 126. In certain embodiments, a single sensor 128 may be located on the distribution header 126 at a location where the flow of the granular product from the primary distribution hose 148 is diverted to the plurality of secondary distribution hoses 128.

The near-plug monitoring system 156 utilizes the feedback from the particle flow rate/counting sensors 158 to determine if a plug is impending or about to occur in one or more secondary distribution hoses 128 and when a near-plug condition is occurring actively takes action (via controller) in real-time to resolve the near-plug condition. In particular, a controller 160 is communicatively coupled to the sensors 158. The controller 160 is configured to receive feedback from the sensors 158 and determine a flow rate in each secondary distribution hose 128. The controller 160 is configured to compare the respective flow rates of the granular product within each secondary distribution hose 128 to an acceptable flow rate threshold to determine if a near-plug condition is occurring. In certain embodiments, the controller 160 may determine that a near-plug condition is occurring if the flow rate of a single secondary distribution hose 128 falls below the threshold unexpectedly. In certain embodiments, the controller 160 may determine that a near-plug condition is occurring if the respective flow rates of multiple secondary distribution hoses 128 (e.g., for a single distribution header 126) fall below the threshold. In certain embodiments, the controller 160 may determine that a near-plug condition is occurring if the flow rates of all of the secondary distribution hoses 128 (e.g., for a single distribution header 126) fall below the threshold. In certain embodiments, the controller 160 is configured to compare the respective flow rates of the granular product within each secondary distribution hose 128 to each other to determine if a near-plug condition is occurring. For example, if one or more of the respective flow rates falls below the average flow rate (for all of the hoses 128 for a single distribution header 126) by a given threshold percentage then the controller 160 may determine that a near-plug condition is occurring.

In response to determining that a near-plug condition is occurring, the controller 160 is configured to automatically take action (e.g., via control signals) to alter an operating parameter of the distribution system 150. For example, altering the operating parameter of the distribution system 150 when a near-plug condition is occurring may include altering an automatic fan control system parameter. For example, the speed of the fan 154 may be increased or the air velocity or mass air flow rate may be increased in the primary distribution hose 148. In certain embodiments, altering the operating parameter of the distribution system 150 when a near-plug condition is occurring may include altering a product flow rate or application flow rate of the granular product temporarily and/or altering the machine ground speed. In certain embodiments, altering the operating parameter of the distribution system 150 when a near-plug condition is occurring may include altering how even the granular product is diverted to the secondary distribution hoses 126 from the primary distribution line at the distribution header 126.

Besides altering the operating parameter of the distribution system 150, the controller 160 may cause output of a user perceptible alert (e.g., on a device within a cab of the work vehicle or on a device the operator possesses) to an operator when a near-plug condition is occurring. In certain embodiments, the controller 160 may cause output of a user perceptible alert when altering the operating parameter of the distribution system 150 does not resolve the near-plug condition and/or a plug has occurred.

The controller 160 may include a memory 162 and a processor 164. In some embodiments, the processor 164 may include one or more general purpose processors, one or more application specific integrated circuits, one or more field programmable gate arrays, or the like. Additionally, the memory 162 may be any tangible, non-transitory, computer readable medium that is capable of storing instructions (e.g., related to near-plug monitoring, product metering, fan control, etc.) executable by the processor 164 and/or data that may be processed by the processor 164. In other words, the memory 162 may include volatile memory, such as random access memory, or non-volatile memory, such as hard disk drives, read only memory, optical disks, flash memory, and the like. Besides the sensors 158, the controller 160 may be communicatively coupled to the fans 154 and/or the product metering system 152 and control their respective operations. For example, the controller 160 may be used to control the operation of the meter rollers. The controller 160 may control whether meter rollers are started or stopped, and/or determine a turn rate for each individual meter roller.

In certain embodiments, a similar near-plug monitoring system 156 may monitor product flow within the primary distribution hoses 148. In this embodiment, particle flow or particle counting sensors 167 may be disposed along the primary distribution hoses 148. The sensors 158 may or may not still be disposed along the secondary distribution lines 128 or the distribution header 126. The controller 160 may receive the feedback from the sensors 167, determine a real-time flow rate of the granular product within the primary distribution hoses 148, and determine if a near-plug condition is occurring in at least one secondary distribution lines 128 based on the real-time flow rate in at least one secondary distribution line 128 and the real-time flow in the primary distribution hose 148.

Figure 3:
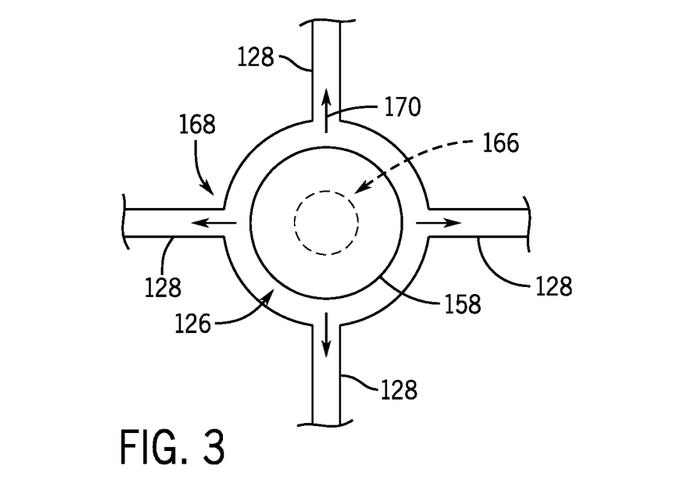
FIG. 3 is a schematic diagram of a distribution header coupled to a particle flow rate or particle counting sensor, in accordance with an embodiment.

As mentioned above, a particle flow rate or particle counting sensor or sensor array may be disposed on the distribution header. FIG. 3 is a schematic diagram of the distribution header 126 coupled to the particle flow rate or particle counting sensor 158. As depicted, the distribution header 126 is coupled to secondary distribution hoses 128. Entrained granular product flows into a port 166 of the distribution header 126 (e.g., via a primary distribution hose) and then is diverted into ports 168 of the secondary distribution hoses 128 as indicated by the arrows 170. The sensor 158 is disposed above the port 166 of the distribution header 126. In particular, the sensor 158 is disposed at a location where the flow of the granular product from the primary distribution hose is diverted to the secondary distribution hoses 128. Thus, the sensor 158 can monitor the flow of the granular product to each of the secondary distribution hoses 128.

Figure 4:
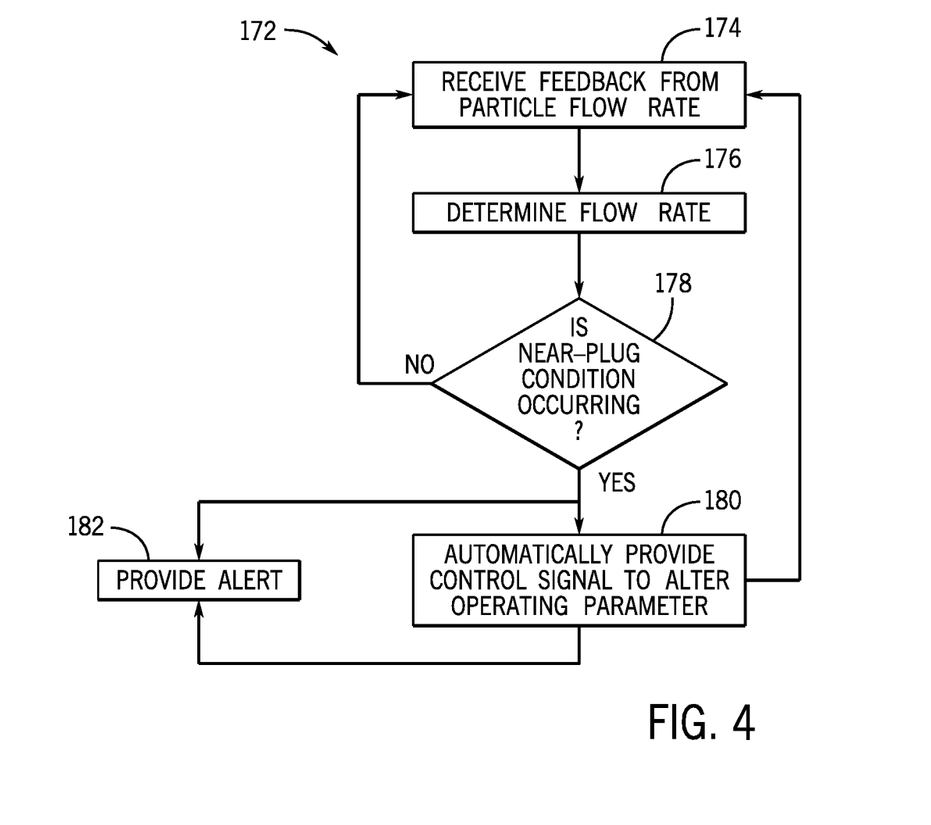
FIG. 4 is a flow diagram of a method for near-plug monitoring of a distribution system, in accordance with an embodiment.

FIG. 4 is a flow diagram of a method 172 for near-plug monitoring of a distribution system (e.g., pneumatic conveyance system). One or more of the steps of the method 172 may be performed by a controller (e.g., controller 160 in FIG. 2). The method 172 includes receiving feedback from one or more particle flow rate or particle counting sensors coupled to or downstream of a distribution header (block 174). As described above, the distribution header is coupled to a primary distribution line and a plurality of secondary distribution lines, the distribution header is configured to receive a flow of a granular product from the primary distribution line and to divert the flow of the granular product among the plurality of secondary distribution lines. The method 172 also includes determining a flow rate in each of the secondary distribution lines based on the feedback (e.g., sensor signals) from the sensors (block 176).

The method 172 further includes determining if a near-plug condition is occurring in at least one secondary distribution line of the plurality of secondary distribution lines based on the flow rates in each of the secondary distribution lines (block 178). In certain embodiments, determining if a near-plug condition is occurring includes comparing the respective flow rates of the granular product within each secondary distribution line to an acceptable flow rate threshold to determine if a near-plug condition is occurring. The controller may determine that a near-plug condition is occurring if the flow rate of a single secondary distribution line falls below the threshold. In certain embodiments, the controller may determine that a near-plug condition is occurring if the respective flow rates of multiple secondary distribution lines (e.g., for a single distribution header) fall below the threshold. In certain embodiments, the controller may determine that a near-plug condition is occurring if the flow rates of all of the secondary distribution lines (e.g., for a single distribution header) fall below the threshold. In certain embodiments, the controller is configured to compare the respective flow rates of the granular product within each secondary distribution line to each other to determine if a near-plug condition is occurring. For example, if one or more of the respective flow rates falls below the average flow rate (for all of the secondary distribution lines for a single distribution header) by a given threshold percentage then the controller may determine that a near-plug condition is occurring. If a near-plug condition is not occurring, the method 172 continues with blocks 174 and 176.

If a near-plug condition is occurring, the method 172 includes automatically providing a control signal to alter an operating parameter of the distribution system or pneumatic conveyance system (block 180). For example, altering the operating parameter of the distribution system when a near-plug condition is occurring may include altering an automatic fan control system parameter. For example, the speed of a fan may be increased or the air velocity or mass air flow rate may be increased in the primary distribution hose. In certain embodiments, altering the operating parameter of the distribution system when a near-plug condition is occurring may include altering a product flow rate or application flow rate of the granular product or ground speed. In certain embodiments, altering the operating parameter of the distribution system when a near-plug condition is occurring may include altering how even the granular product is diverted to the secondary distribution hoses from the primary distribution line at the distribution header. Upon altering the operating parameter or simultaneous with altering the operating parameter, the method 172 continues with blocks 174 and 176.

In certain embodiments, besides altering the operating parameter of the distribution system, the method 172 includes outputting or providing a user perceptible alert (e.g., on a device within a cab of the work vehicle or on a device the operator possesses) to an operator when a near-plug condition is occurring (block 182). In certain embodiments, the method 172 includes outputting or providing a user perceptible alert (block 182) when altering the operating parameter of the distribution system does not resolve the near-plug condition and/or a plug has occurred. If near-plug condition persist and cannot be solved by adjusting fan, the operator could be alerted (block 182) and the machine could be instructed to reduce travel speed to avoid system plugging. In this case, operator would be alerted to upcoming reduced ground speed command for plug avoidance.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A near-plug monitoring system for a pneumatic conveyance system of an agricultural implement, comprising:

one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines, wherein the one or more particle flow rate sensors comprise a respective particle flow rate sensor coupled to each respective secondary distribution line of the plurality of distribution lines adjacent the distribution header; and a controller coupled to the one or more particle flow rate sensors and configured to receive feedback from the one or more particle flow rate sensors, to determine a respective real-time flow rate of the granular product in the plurality of secondary distribution lines, to determine if a near-plug condition is occurring in at least one secondary distribution line of the plurality of secondary distribution lines based on the real-time flow rate in the at least one secondary distribution line, and to automatically provide a control signal to alter one or more operating parameters of the pneumatic conveyance system when the near-plug condition is occurring to resolve the near-plug condition, and wherein the controller is configured to determine a respective real-time flow rate for the granular product in each respective secondary distribution line based on the feedback from the respective particle flow rate sensors and to compare the respective real-time flow rates to each other to determine if the near-plug condition is occurring.

2. The system of claim 1, wherein the one or more particle flow rate sensors comprise a particle flow rate sensor coupled to the distribution header at a location where the flow of the granular product from the primary distribution line is diverted to the plurality of secondary distribution lines.

3. The system of claim 1, wherein altering the one or more operating parameters of the pneumatic conveyance system when the near-plug condition is occurring comprises altering an automatic fan control system parameter.

4. The system of claim 3, wherein the automatic fan control system parameter comprises a rotational speed of a fan fluidly coupled to the primary distribution line, air velocity in the primary distribution line, or mass air flow rate in the primary distribution line.

5. The system of claim 1, wherein altering the one or more operating parameters of the pneumatic conveyance system when the near plug condition is occurring comprises altering a product flow rate or application flow rate of the granular product.

6. The system of claim 1, wherein the altering the one or more operating parameters of the pneumatic conveyance system when the near plug condition is occurring comprises altering how even the granular product is diverted to the plurality of secondary distribution lines from the primary distribution line.

7. The system of claim 1, wherein the controller is configured to cause output of a user perceptible alert to an operator when the near-plug condition is occurring.

8. The system of claim 1, wherein the controller is configured to cause output of a user perceptible alert to an operator when altering the one or more operating parameters of the pneumatic conveyance system when the near-plug condition is occurring does not resolve the near-plug condition.

9. The system of claim 1, wherein the controller is configured to provide an additional control signal to reduce a travel speed of a work vehicle moving the agricultural implement when the near-plug condition is occurring to resolve the near-plug condition.

10. A method for near-plug monitoring of a pneumatic conveyance system of an agricultural implement, comprising:

receiving, at a controller, feedback from one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines, wherein the one or more particle flow rate sensors comprise a respective particle flow rate sensor coupled to each respective secondary distribution line of the plurality of distribution lines adjacent the distribution header;

determining, via the controller, a respective real-time flow rate of the granular product in each respective secondary distribution line of the plurality of secondary distribution lines based on the feedback from the respective particle flow rate sensors;

determining, via the controller, if a near-plug condition is occurring in at least one secondary distribution line of the plurality of secondary distribution lines based on the real-time flow rate in the at least one secondary distribution line by comparing the respective real-time flow rates to each other to determine if the near-plug condition is occurring; and automatically providing, via the controller, a control signal to alter one or more operating parameters of the pneumatic conveyance system when the near-plug condition is occurring to resolve the near-plug condition.

11. A near-plug monitoring system for a pneumatic conveyance system of an agricultural implement, comprising:

one or more particle flow rate sensors coupled to or downstream of a distribution header, wherein the distribution header is coupled to a primary distribution line and a plurality of secondary distribution lines, the distribution header is configured to receive a flow of a granular product from the primary distribution line and to divert the flow of the granular product among the plurality of secondary distribution lines;

an additional particle flow rate sensor coupled to the primary distribution line upstream of the distribution header; and a controller coupled to the one or more particle flow rate sensors and configured to receive feedback from the one or more particle flow rate sensors, to determine a real-time flow rate of the granular product in the plurality of secondary distribution lines, to determine if a near-plug condition is occurring in at least one secondary distribution line of the plurality of secondary distribution lines based on the real-time flow rate in the at least one secondary distribution line, and to automatically provide a control signal to alter one or more operating parameters of the pneumatic conveyance system when the near-plug condition is occurring to resolve the near-plug condition, and wherein the controller is coupled to the additional particle flow rate sensor and is configured to receive feedback from the additional particle flow rate sensor, to determine a real-time flow rate of the granular product in the primary distribution line, and to determine if the near-plug condition is occurring in at least one secondary distribution line of the plurality of secondary distribution lines based on the real-time flow rate in the at least one secondary distribution line and the real-time flow rate in the primary distribution line.

\* \* \* \* \*